(12) United States Patent
Kojima (10) Patent No.: US 9,038,995 B2
(45) Date of Patent: May 26, 2015

(54) VIBRATION ISOLATOR

(75) Inventor: Hiroshi Kojima, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/232,657

(22) PCT Filed: Jul. 17, 2012

(86) PCT No.: PCT/JP2012/068072
§ 371 (c)(1),
(2), (4) Date: Jan. 14, 2014

(87) PCT Pub. No.: WO2013/011976
PCT Pub. Date: Jan. 24, 2013

(65) Prior Publication Data
US 2014/0159290 A1    Jun. 12, 2014

(30) Foreign Application Priority Data
Jul. 15, 2011    (JP) .................................. 2011-157004

(51) Int. Cl.
*F16F 13/10*    (2006.01)
*F16F 13/08*    (2006.01)
*F16F 13/18*    (2006.01)

(52) U.S. Cl.
CPC ................. *F16F 13/08* (2013.01); *F16F 13/18* (2013.01)

(58) Field of Classification Search
USPC ................. 267/140.11–140.13, 140.2–140.5, 267/141.1–141.7
See application file for complete search history.

(56) References Cited

U.S. PATENT DOCUMENTS

2004/0159992 A1    8/2004    Richter et al.
2006/0043658 A1*   3/2006    Tanaka et al. ............ 267/140.13
(Continued)

FOREIGN PATENT DOCUMENTS

CN    101413563 A    4/2009
JP    55111640 U     8/1980
(Continued)

OTHER PUBLICATIONS

International Search Report for PCT/JP2012/068072 dated Oct. 9, 2012.
(Continued)

*Primary Examiner* — Christopher Schwartz
(74) *Attorney, Agent, or Firm* — Sughrue Mion, PLLC (57) ABSTRACT

A vibration isolator includes an inner tube (11), an outer tube (12) surrounding the inner tube (11) from a radial outer side of the inner tube, and an elastic body (13) coupling the inner tube (11) and the outer tube (12). Multiple pressure-absorbing fluid chambers (35, 36), whose walls are partly formed by the elastic body (13), are disposed inside the outer tube (12), and include a pair of first pressure-absorbing fluid chambers (35) interconnected through first restricting passages (37), and a second pressure-absorbing fluid chamber (36) connected to an auxiliary fluid chamber (28), in which a fluid is filled, through a second restricting passage. The pair of first pressure-absorbing fluid chambers (35) are disposed to sandwich the inner tube (11) therebetween. The second pressure-absorbing fluid chamber (36) is arranged in parallel to the inner tube (11) in an orthogonal direction (C) perpendicular to both an axial direction of the inner tube (11) and a sandwiching direction (B) in which the inner tube (11) is sandwiched between the pair of first pressure-absorbing fluid chambers (35). The inner tube (11) runs along overall lengths of the pair of first pressure-absorbing fluid chambers (35) and the second pressure-absorbing fluid chamber (36) in the axial direction.

3 Claims, 5 Drawing Sheets

(56) References Cited

U.S. PATENT DOCUMENTS

| | | | |
|---|---|---|---|
| 2006/0091594 A1* | 5/2006 | Miyahara | 267/140.13 |
| 2011/0042870 A1* | 2/2011 | Kojima | 267/140.11 |
| 2013/0161883 A1* | 6/2013 | Nishi et al. | 267/140.13 |

FOREIGN PATENT DOCUMENTS

| | | |
|---|---|---|
| JP | 56-29335 U | 3/1981 |
| JP | 2002-188676 A | 7/2002 |
| JP | 2002-327788 A | 11/2002 |
| JP | 2007-205571 A | 8/2007 |
| JP | 2008-45748 A | 2/2008 |

OTHER PUBLICATIONS

Communication dated Nov. 26, 2014 from the State Intellectual Property Office of People's Republic of China in counterpart Application No. 201280034445.0.

* cited by examiner

FIG. 5 and Problem

VIBRATION ISOLATOR

TECHNICAL FIELD

The present invention relates to a vibration isolator that is applied to, for instance, a motor vehicle or an industrial machine so as to absorb and attenuate vibrations of a vibration generating part such as an engine.

Priority is claimed on Japanese Patent Application No. 2011-157004, filed on Jul. 15, 2011, the content of which is incorporated herein by reference.

BACKGROUND ART

Conventionally, a vibration isolator as disclosed in, for instance, Patent Document 1 below, is known. Such a vibration isolator includes an inner tube that is coupled to one of a vibration generating part and a vibration absorbing part, an outer tube that surrounds the inner tube from a radial outer side of the inner tube and is coupled to the other of the vibration generating part and the vibration absorbing part, and an elastic body that couples the inner tube and the outer tube. A plurality of pressure-absorbing fluid chambers, which are filled with a fluid and whose walls are partly formed by the elastic body, are disposed inside the outer tube. These pressure-absorbing fluid chambers include a pair of first pressure-absorbing fluid chambers that communicate with each other through first restricting passages, and a second pressure-absorbing fluid chamber that communicates with an auxiliary fluid chamber, in which the fluid is filled, through a second restricting passage.

The pair of first pressure-absorbing fluid chambers are disposed to sandwich the inner tube therebetween, and the second pressure-absorbing fluid chamber is disposed in parallel with an axial direction of the inner tube. The vibration isolator absorbs or attenuates vibrations in both the axial direction and a sandwiching direction in which the pair of first pressure-absorbing fluid chambers sandwich the inner tube.

CITATION LIST

Patent Document

Patent Document 1

Japanese Unexamined Patent Application, First Publication No. 2002-327788

SUMMARY OF INVENTION

Technical Problem

However, in the conventional vibration isolator, it is difficult to maintain performance of the elastic body for a long period of time.

The present invention has been made in consideration of such circumstances and an object of the present invention is to provide a vibration isolator capable of easily maintaining performance of an elastic body for a long period of time.

Solution to Problem

To address the aforementioned problem, the present invention proposes the following means.

According to a first aspect of the present invention, a vibration isolator includes: an inner tube that is coupled to one of a vibration generating part and a vibration absorbing part; an outer tube that surrounds the inner tube from a radial outer side of the inner tube and is coupled to the other of the vibration generating part and the vibration absorbing part; and an elastic body that couples the inner tube and the outer tube. Further, a plurality of pressure-absorbing fluid chambers, which are filled with a fluid and whose walls are partly formed by the elastic body, are disposed inside the outer tube. Further, the pressure-absorbing fluid chambers include a pair of first pressure-absorbing fluid chambers that communicate with each other through first restricting passages, and a second pressure-absorbing fluid chamber that communicates with an auxiliary fluid chamber, in which the fluid is filled, through a second restricting passage. Further, the pair of first pressure-absorbing fluid chambers are disposed to sandwich the inner tube therebetween. Further, the second pressure-absorbing fluid chamber is arranged in parallel to the inner tube in an orthogonal direction perpendicular to both an axial direction of the inner tube and a sandwiching direction in which the inner tube is sandwiched between the pair of first pressure-absorbing fluid chambers. In addition, the inner tube runs along overall lengths of the pair of first pressure-absorbing fluid chambers and the second pressure-absorbing fluid chamber in the axial direction.

In this case, when vibration is input to the vibration isolator in the sandwiching direction, the inner tube and the outer tube are relatively displaced in the sandwiching direction while elastically deforming the elastic body. Thereby, the pair of first pressure-absorbing fluid chambers are individually expanded or contracted. The fluid flows through the first restricting passages, and the vibration is absorbed and attenuated.

Further, when vibration is input to the vibration isolator in the orthogonal direction, the inner tube and the outer tube are relatively displaced in the orthogonal direction while elastically deforming the elastic body. Thereby, the second pressure-absorbing fluid chamber is expanded or contracted. The fluid flows through the second restricting passage between the second pressure-absorbing fluid chamber and the auxiliary fluid chamber, and the vibration is absorbed and attenuated.

The inner tube extends along overall lengths of the pair of first pressure-absorbing fluid chambers and the second pressure-absorbing fluid chamber in the axial direction. For this reason, when the vibrations of the sandwiching direction and the orthogonal direction are input to the vibration isolator, the inner tube and the outer tube are relatively displaced in the sandwiching direction and the orthogonal direction. Accordingly, the pressure-absorbing fluid chambers can be greatly deformed and expanded or contracted over their overall lengths in the axial direction. Thereby, it is easy to greatly expand or contract the pressure-absorbing fluid chambers while suppressing an amount of elastic deformation of the elastic body. As a result, it is possible to suppress a load applied to the elastic body to easily maintain the performance of the elastic body for a long period of time.

Further, when the vibration isolator is viewed from the front in the axial direction, the outer tube may be formed in a rectangular shape having a pair of first side parts extending in the sandwiching direction and a pair of second side parts extending in the orthogonal direction.

In this case, as the outer tube is formed in the aforementioned structure, it is possible to easily discriminate the sandwiching direction from the orthogonal direction. As a result, it is possible to improve handleability of the vibration isolator.

When the vibration isolator is installed in a space with predetermined restricted dimensions in a vehicle, it is possible to secure a great inner space of the outer tube, compared to when a vibration isolator having a circular outer tube is installed in such a space. For this reason, it is possible to equip the elastic body having a great volume. Thereby, it is possible to improve a spring characteristic. Further, it is possible to provide the fluid chamber having a high capacity. Thereby, it is possible to improve attenuation performance of the vibration isolator. In other words, in comparison with the circular outer tube, the rectangular outer tube secures a great inner space, and has a space that can be used for various applications. As a result, it is possible to improve a degree of freedom in designing the vibration isolator, and to cope with the predetermined dimensions required by a type of vehicle.

Further, the elastic body may include partition parts that separate the first pressure-absorbing fluid chamber and the second pressure-absorbing fluid chamber in a circumferential direction of the inner tube. Further, the partition parts may extend from corners of the outer tube in a direction inclined to both directions of the sandwiching direction and the orthogonal direction so as to be coupled to the inner tube when viewed from the front.

In this case, when viewed from the front, the partition parts extend from the corners of the outer tube in the inclined direction, and are coupled to the inner tube. For this reason, in comparison with a case in which the partition parts extend in the sandwiching direction and the orthogonal direction, the partition parts can be formed long. Thereby, when the partition parts are elastically deformed, it is possible to distribute a load applied to the partition parts to the entirety of the partition parts, and to inhibit the load from being locally concentrated on the partition parts. As a result, it is possible to easily maintain the performance of the partition parts for a long period of time.

Further, a stopper part to which one of the inner circumferential surface of the outer tube and the outer circumferential surface of the inner tube is coupled is disposed inside the outer tube. When the inner tube and the outer tube are relatively displaced in the sandwiching direction, and when the inner tube and the outer tube are relatively displaced in the orthogonal direction, the stopper part may be engaged with one of the inner circumferential surface of the outer tube and the outer circumferential surface of the inner tube on the other side, and restrict additional displacement.

In this case, since the stopper part is engaged with one of the inner circumferential surface of the outer tube and the outer circumferential surface of the inner tube on the other side, and restricts the additional displacement when the inner tube and the outer tube are relatively displaced in the sandwiching direction, and when the inner tube and the outer tube are relatively displaced in the orthogonal direction, it is possible to inhibit the elastic body from being excessively deformed. As a result, it is possible to reliably maintain the performance of the elastic body for a long period of time with ease.

Further, since the stopper part is disposed inside the outer tube, it is possible to inhibit the vibration isolator from being enlarged by providing the stopper part.

Advantageous Effects of Invention

In the vibration isolator according to the present invention, it is possible to easily maintain the performance of the elastic body for a long period of time.

DESCRIPTION OF EMBODIMENTS

Hereinafter, a vibration isolator according to an embodiment of the present invention will be described with reference to the drawings.

Figure 1:
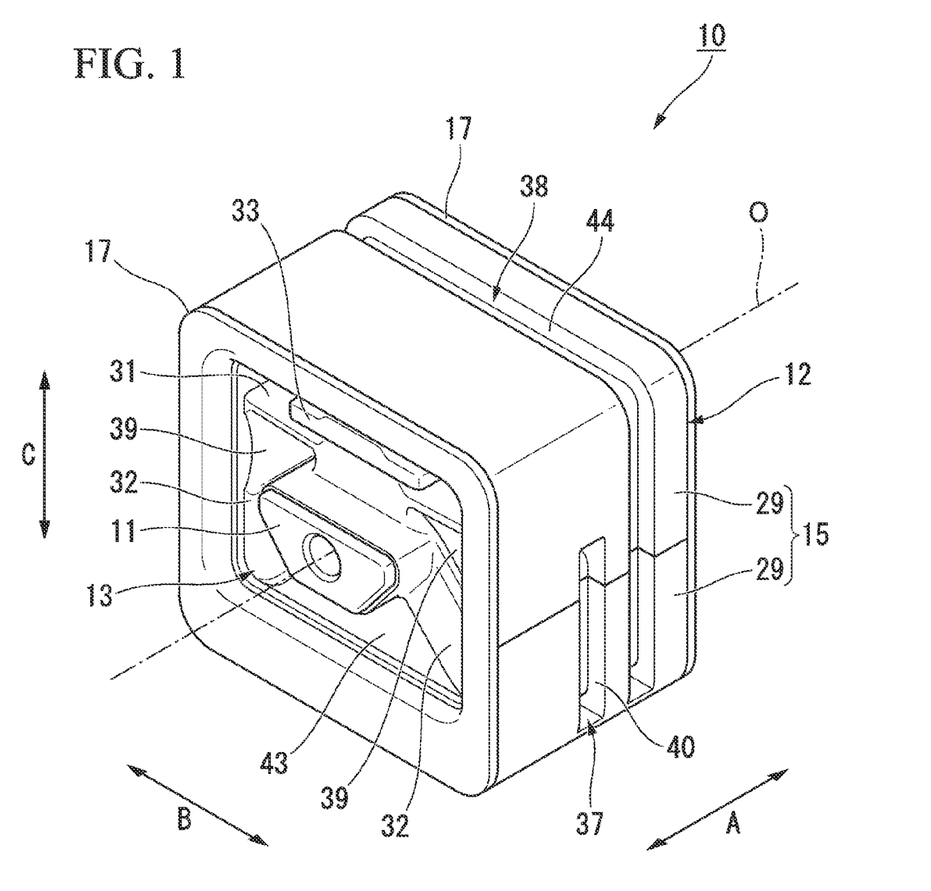
FIG. 1 is a perspective view showing a vibration isolator according to an embodiment of the present invention.
Figure 2:
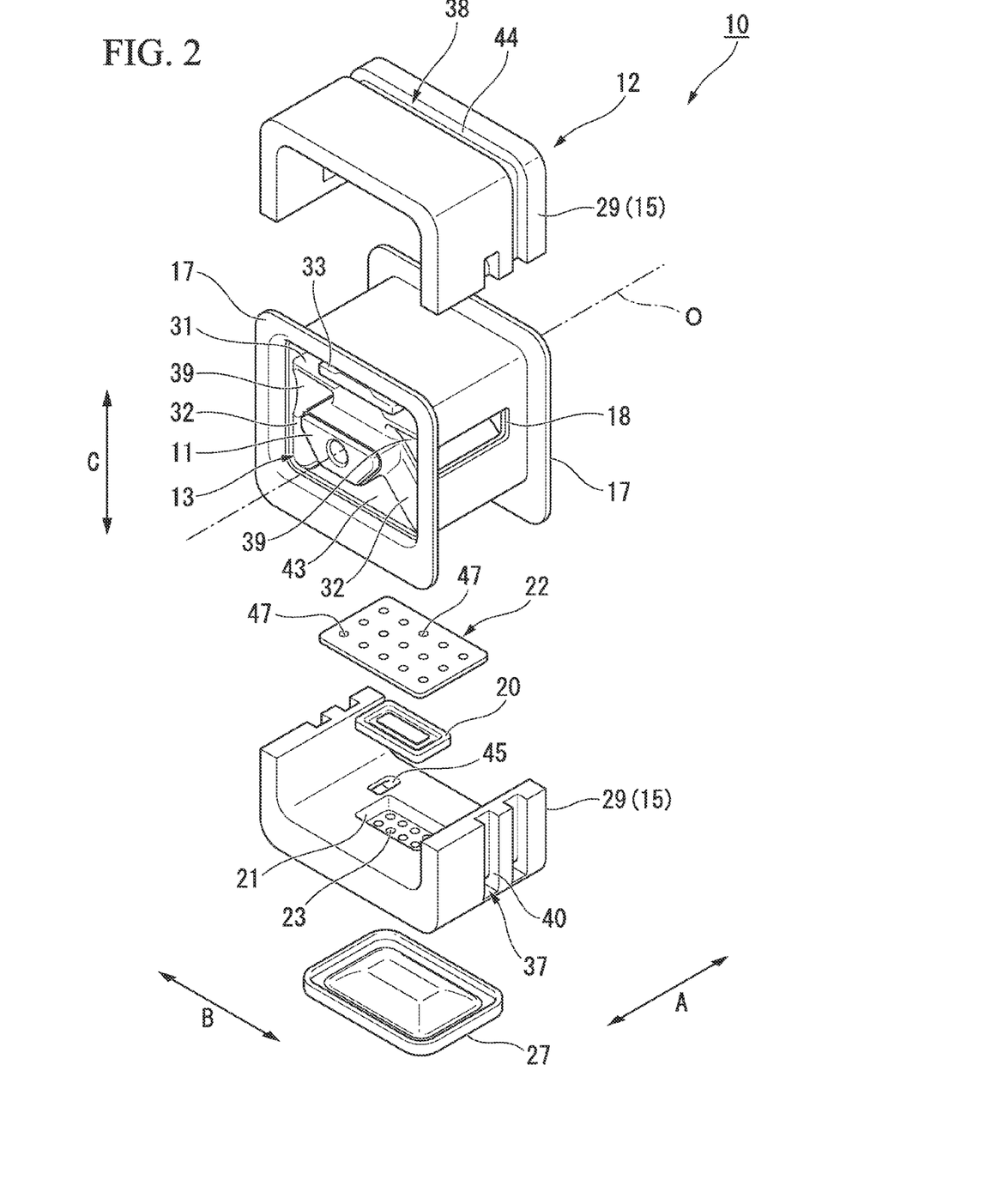
FIG. 2 is an exploded perspective view showing the vibration isolator shown in FIG. 1.

As shown in FIGS. 1 and 2, a vibration isolator 10 includes an inner tube 11 that is coupled to one of a vibration generating part and a vibration absorbing part, an outer tube 12 that surrounds the inner tube 11 from a radial outer side of the inner tube 11 and is coupled to the other of the vibration generating part and the vibration absorbing part, and an elastic body 13 that couples the inner tube 11 and the outer tube 12. The vibration isolator 10 is filled with, for instance, ethylene glycol, water, or silicone oil serving as a fluid. The vibration isolator 10 is a so-called fluid-filled vibration isolator.

The inner tube 11 is formed of a hard material such as a metal material. An inserting member (not shown) extending in an axial direction A of the inner tube 11 is inserted into the inner tube 11. One of the vibration generating part and the vibration absorbing part is coupled to the inner tube 11 via the inserting member.

Figure 3:
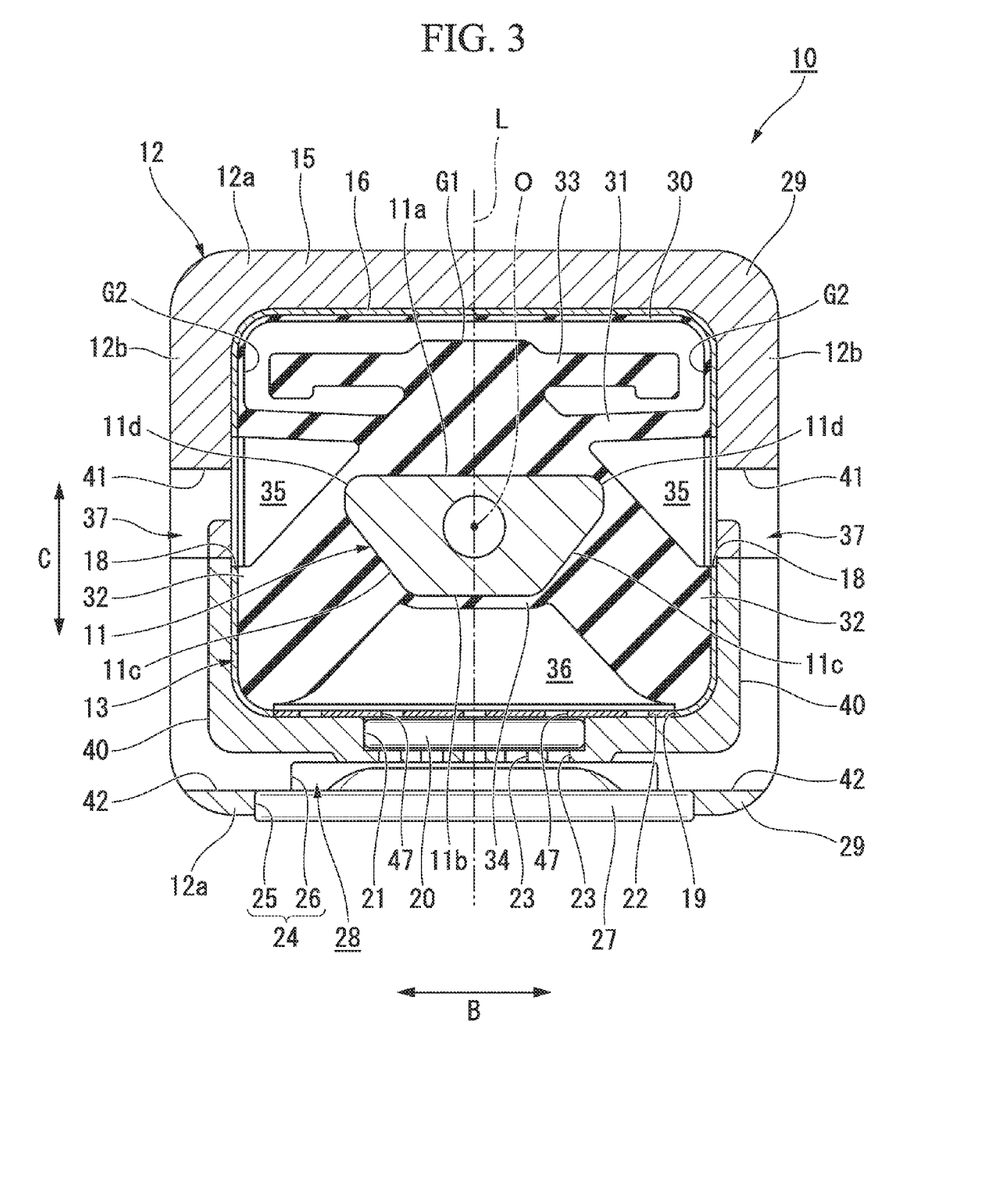
FIG. 3 is a cross-sectional view showing the vibration isolator shown in FIG. 1 in both of one direction and another direction.

Further, as shown in FIG. 3, when the vibration isolator 10 is viewed from the front in the axial direction A, the inner tube 11 is formed in the shape of a trapezoid having a pair of opposite sides 11a and 11b that extend in one direction (sandwiching direction) B along an orthogonal plane (not shown) perpendicular to an axis O of the inner tube 11. In the shown example, when viewed from the front, the inner tube 11 is formed along another direction (orthogonal direction) C perpendicular to the orthogonal plane and the one direction B. The inner tube 11 is formed in line symmetry with respect to a virtual line L passing over the axis O of the inner tube 11, in what is known as an isosceles trapezoid shape.

Hereinafter, of the pair of opposite sides 11a and 11b extending in the one direction B, the side at which the long side 11a is located is referred to as an upper side, and the side at which the short side 11b is located is referred to as a lower side.

The outer tube 12 is arranged coaxially with the inner tube 11. When viewed from the front, the outer tube 12 is formed in the shape of a rectangle having a pair of first side parts 12a extending in the one direction B and a pair of second side parts 12b extending in the other direction C. The outer tube 12 is fitted into a bracket member (not shown), and the other of the vibration generating part and the vibration absorbing part is coupled to the outer tube 12 via the bracket member.

As shown in FIG. 2, the outer tube 12 includes outer and inner tube parts 15 and 16 formed of a hard material such as a metal material, and has a dual tube structure in which the inner tube part 16 is fitted into the outer tube part 15. Sizes of the outer and inner tube parts 15 and 16 based on the axial direction A are equal to each other. A pair of annular flange parts 17, each of which has the same outer diameter as the outer tube part 15, are individually coupled to opposite end edges of the inner tube part 16 which are located in the axial direction A by inner circumferential edges of a pair of annular flange parts 17. The annular flange parts 17 restrict relative movement between the outer tube part 15 and the inner tube part 16 in the axial direction A.

When the vibration isolator 10 is viewed from the side in the one direction B, portions of the inner tube part 16 which are directed in the one direction B are individually formed with first openings 18, each of which has a rectangular shape, by extending in both the axial direction A and the other direction C.

Further, as shown in FIG. 3, a portion of the inner tube part 16 which is opposite to the inner tube 11 from the lower side of the inner tube 11 is formed with a second opening 19. The second opening 19 is spatially connected to a holding recess 21 which is formed in an inner circumferential surface of the outer tube part 15 and in which a membrane member 20 is held. As shown in FIG. 2, when the vibration isolator 10 is viewed from the top in the other direction C, the membrane member 20 is formed of, for instance, a rubber material, and is formed to extend in both the axial direction A and the one direction B to have a rectangular shape. The membrane member 20 is inhibited from being separated from an interior of the holding recess 21 by a pressing plate 22 fitted into the second opening 19.

Further, as shown in FIG. 3, an outer circumferential surface of the outer tube part 15 is formed with a fluid chamber recess 24 that passes a plurality of communicating holes 23 formed in the bottom of the outer tube part 15 and communicates with the holding recess 21. The fluid chamber recess 24 is provided in parallel to the holding recess 21 in the other direction C. In the shown example, the fluid chamber recess 24 is located below the holding recess 21. Further, the fluid chamber recess 24 is formed in a stepped shape by a large diameter part 25 that is located at a lower side thereof and is open to the outer circumferential surface of the outer tube part 15 and by a small diameter part 26 that is located at an upper side thereof and has a larger inner diameter than the holding recess 21.

The fluid chamber recess 24 is blocked by a diaphragm member 27, and thereby an auxiliary fluid chamber 28 is formed which is filled with a fluid and is expanded or contracted in response to a change in fluid pressure. As shown in FIG. 2, when viewed from the top, the diaphragm member 27 is formed in a rectangular shape by extending in both the axial direction A and the one direction B. As shown in FIG. 3, the diaphragm member 27 is fitted into the large diameter part 25 of the fluid chamber recess 24. Further, in the diaphragm member 27, a middle portion located inside the outer circumferential edge swells upward and is disposed inside the small diameter part 26 of the fluid chamber recess 24. The diaphragm member 27 is deformed in response to the change in the fluid pressure of the auxiliary fluid chamber 28.

In the shown example, the outer tube part 15 is constituted in such a manner that a pair of divided bodies 29 into which the outer tube part 15 is divided in the one direction B along a divided plane (not shown) extending in both the axial direction A and the one direction B are combined with each other.

The elastic body 13 is formed of, for instance, a rubber material, and is vulcanized and bonded to an inner circumferential surface of the outer tube 12 and an outer circumferential surface of the inner tube 11. A portion which constitutes the inner circumferential surface of the outer tube 12 and to which the elastic body 13 is not vulcanized and bonded is covered by a coating film 30 that is integrally formed of the same material as the elastic body 13.

The elastic body 13 includes a main wall part 31 arranged above the inner tube 11, and auxiliary wall parts (partition parts) 32 arranged below the inner tube 11.

The main wall part 31 extends in the one direction B. The outer circumferential surface of the inner tube 11 is coupled to a middle portion of the main wall part 31 which is located the one direction B from a lower side of the middle portion of the main wall part 31. Opposite end edges of the main wall part 31 which are located in the one direction B are individually coupled to portions that constitute the inner circumferential surface of the outer tube 12 and are located above the first openings 18. In the shown example, opposite ends of the main wall part 31 which are located outside a middle portion of the main wall part 31 in the one direction B are formed at a thinner thickness than the middle portion of the main wall part 31, and can be subjected to elastic deformation with ease.

Further, a stopper part 33 is connected to the main wall part 31, and restricts relative displacement that occurs between the inner tube 11 and the outer tube 12 in the one direction B and the other direction C at a fixed amount or more. The stopper part 33 is disposed inside the outer tube 12, and in the present embodiment, is connected to the outer circumferential surface of the inner tube 11 via the main wall part 31 of the elastic body 13. The stopper part 33 is integrally formed using the same material as the elastic body 13, and extends in the one direction B. A middle portion of the stopper part 33 which is located in the one direction B is connected to the middle portion of the main wall part 31 which is located in the one direction B from an upper part of the middle portion of the main wall part 31.

Above the middle portion of the stopper part 33 which is located in the one direction B, an upper gap G1 is provided between the middle portion of the stopper part 33 and the inner circumferential surface of the outer tube 12. Further, lateral gaps G2 of the one direction B are individually provided between opposite end edges of the stopper part 33 which are located in the one direction B and the inner circumferential surface of the outer tube 12.

A pair of auxiliary wall parts 32 are provided in the one direction B at an interval. When viewed from the front, each auxiliary wall part 32 is installed by extending from a corner of the outer tube 12 in a direction inclined to both the one direction B and the other direction C. The auxiliary wall parts 32 are coupled to the inner tube 11. In the present embodiment, the auxiliary wall parts 32 are individually coupled to two of four corners of the outer tube 12 in which the two corners are located on the lower side. The auxiliary wall parts 32 gradually extend inward in the one direction B from bottom to top. When viewed from the front, the auxiliary wall parts 32 are individually coupled to inclined sides 11c connecting the pair of opposite sides 11a and 11b of the inner tube 11. When viewed from the front, the auxiliary wall parts 32 are individually coupled to the middle portion of the main wall part 31 which is located in the one direction B on connecting corners 11d, each of which connects the long side 11a and the inclined side 11c. Both of the auxiliary wall parts 32 are integrally coupled via a connecting membrane 34 that is integrally formed of the same material as the auxiliary wall parts 32 and covers the short side 11b.

Figure 4:
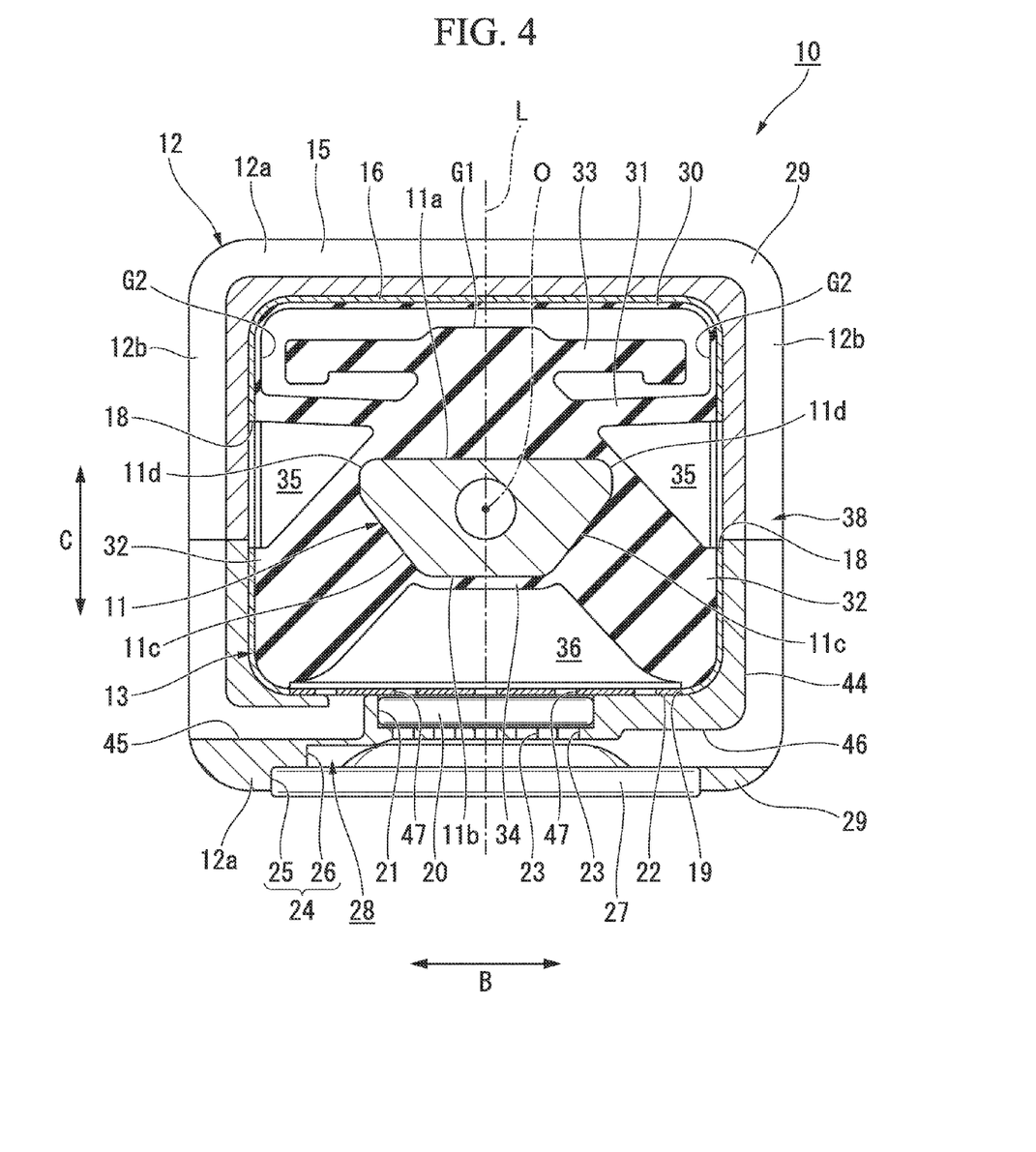
FIG. 4 is a cross-sectional view showing the vibration isolator shown in FIG. 1 in both the one direction and the other direction.

A plurality of pressure-absorbing fluid chambers 35 and 36, which are filled with a fluid and whose walls are partly formed by the elastic body 13, are disposed inside the outer tube 12. As shown in FIGS. 3 and 4, these pressure-absorbing fluid chambers 35 and 36 include a pair of first pressure-absorbing fluid chambers 35 that communicate with each other through first restricting passages 37, and a second pressure-absorbing fluid chamber 36 that communicates with the auxiliary fluid chamber 28 through a second restricting passage 38. Further, in the present embodiment, the first pressure-absorbing fluid chambers 35 and the second pressure-absorbing fluid chamber 36 are separated in the circumferential direction of the inner tube 11 by the auxiliary wall parts 32 of the elastic body 13.

Figure 5:
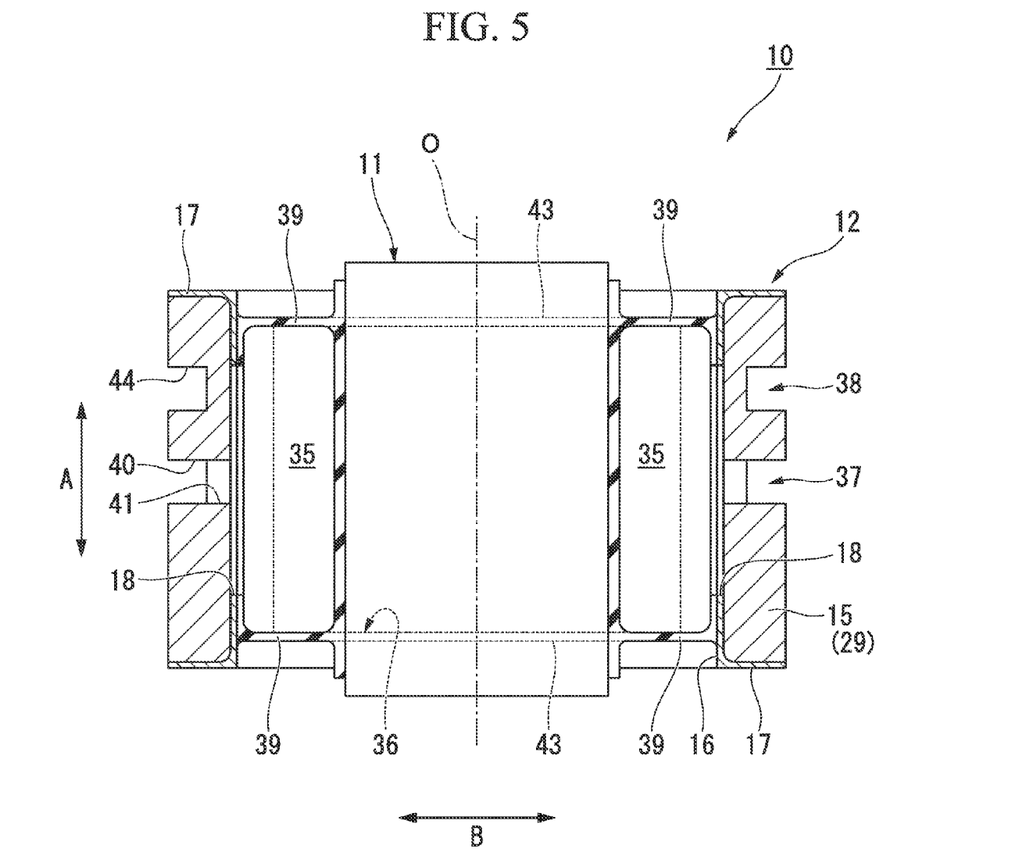
FIG. 5 is a cross-sectional view showing the vibration isolator shown in FIG. 1 in both an axial direction and the one direction.

As shown in FIGS. 3 and 5, the pair of first pressure-absorbing fluid chambers 35 extend in the axial direction A, and are disposed to sandwich the inner tube 11 therebetween in the one direction B. The first pressure-absorbing fluid chambers 35 are formed in such a manner that, in a space formed between each lateral end of the main wall part 31 which is located in the one direction B and each auxiliary wall part 32, opposite ends of the axial direction A are individually blocked by a pair of first blocking walls 39 that are integrally formed using the same material as the main wall part 31 and the auxiliary wall part 32. The first pressure-absorbing fluid chambers 35 communicate with the first openings 18.

As shown in FIG. 3, a pair of the first restricting passages 37 is provided so as to individually communicate with the respective first pressure-absorbing fluid chambers 35 and the auxiliary fluid chamber 28. Further, in the shown example, the pair of first pressure-absorbing fluid chambers 35 communicates with each other through the first restricting passages 37 and the auxiliary fluid chamber 28.

A channel length and a channel cross-sectional area of the first restricting passage 37 are set (tuned) so that a resonant frequency of the first restricting passage 37 becomes a predetermined frequency. The predetermined frequency includes, for example, a frequency of idle vibration (e.g., a frequency between 18 Hz and 30 Hz and an amplitude equal to or less than ±0.5 mm), and a frequency of shake vibration (e.g., a frequency equal to or less than 14 Hz and an amplitude greater than ±0.5 mm) having a lower frequency than the idle vibration.

The first restricting passage 37 includes a first circumferential groove 40 formed in the outer circumferential surface of the outer tube 12, a first pressure-absorbing communicating part 41 causing one circumferential end of the first circumferential groove 40 and the first pressure-absorbing fluid chamber 35 to communicate with each other, and a first auxiliary communicating part 42 causing the other circumferential end of the first circumferential groove 40 and the auxiliary fluid chamber 28 to communicate with each other. The first restricting passage 37 is formed in such a manner that an opening of the first circumferential groove 40 of these components is blocked from the outside by the bracket member.

The one and other circumferential ends of the first circumferential groove 40 are located outside the first pressure-absorbing fluid chamber 35 and the auxiliary fluid chamber 28 in the one direction B, respectively. The first pressure-absorbing communicating part 41 and the first auxiliary communicating part 42 extend in the one direction B.

As shown in FIGS. 4 and 5, the second pressure-absorbing fluid chamber 36 extends in the axial direction A, and is disposed in the other direction C in parallel with the inner tube 11. The second pressure-absorbing fluid chamber 36 is formed in such a manner that, in a space formed among the pair of auxiliary wall parts 32, the inner tube 11, and the pressing plate 22, opposite ends of the axial direction A are individually blocked by the pair of second blocking walls 43 that are integrally formed of the same material as the auxiliary wall parts 32 and the connecting membrane 34. As shown in FIG. 4, the second pressure-absorbing fluid chamber 36 is arranged below the inner tube 11. The second pressure-absorbing fluid chamber 36 and the auxiliary fluid chamber 28 are arranged in parallel with the other direction C with the holding recess 21 sandwiched therebetween.

A channel length and a channel cross-sectional area of the second restricting passage 38 are set (tuned) so that a resonant frequency of the second restricting passage 38 becomes a predetermined frequency.

The second restricting passage 38 includes a second circumferential groove 44 formed in the outer circumferential surface of the outer tube 12, a second pressure-absorbing communicating part 45 causing one circumferential end of the second circumferential groove 44 and the second pressure-absorbing fluid chamber 36 to communicate with each other, and a second auxiliary communicating part 46 causing the other circumferential end of the second circumferential groove 44 and the auxiliary fluid chamber 28 to communicate with each other. The second restricting passage 38 is formed in such a manner that an opening of the second circumferential groove 44 of these components is blocked from the outside by the bracket member.

The second circumferential groove 44 extends in the outer circumferential surface of the outer tube 12 in the circumferential direction so as to avoid the fluid chamber recess 24. Both circumferential ends of the second circumferential groove 44 are located to sandwich the fluid chamber recess 24 therebetween in the one direction B. The second pressure-absorbing communicating part 45 extends inward from the one circumferential end of the second circumferential groove 44 in the one direction B. Next, the second pressure-absorbing communicating part 45 is bent upward to open to the pressing plate 22, and communicates with the interior of the second pressure-absorbing fluid chamber 36 through the through-holes 47 provided to pass through the pressing plate 22 in the other direction C. Further, the second auxiliary communicating part 46 extends in the one direction B.

In the shown example, a plurality of through-holes 47 are formed in the pressing plate 22. Further, some of the through-holes 47 cause the second pressure-absorbing fluid chamber 36 and the holding recess 21 to communicate with each other. The change in the fluid pressure of the second pressure-absorbing fluid chamber 36 has an influence on the membrane member 20 through some of the through-holes 47.

As shown in FIG. 5, in the present embodiment, the inner tube 11 extends over the overall length of the pair of first pressure-absorbing fluid chambers 35 and the second pressure-absorbing fluid chamber 36 in the axial direction A. In the example of FIG. 5, the opposite end edges of the inner tube 11 which are located in the axial direction A protrude outward from the outer tube 12 in the axial direction A. The first blocking walls 39 and the second blocking walls 43 are located in the axial direction A inside the opposite end edges of the inner tube 11 which are located in the axial direction A and the opposite end edges of the outer tube 12 which are located in the axial direction A.

The vibration isolator 10 is a compression type (erection type) vibration isolator having a constitution mounted so that the second pressure-absorbing fluid chamber 36 is located on a vertical upper side, and the auxiliary fluid chamber 28 is located on a vertical lower side. For example, when the vibration isolator 10 is mounted on a motor vehicle, the outer tube 12 is coupled to an engine serving as a vibration generating part via the bracket member. Further, the inner tube 11 is coupled to a vehicle body serving as a vibration absorbing part via the inserting member. In the motor vehicle, primary vibration is easily input from the engine to the vehicle body in a vertical direction, and secondary vibration is easily input from the engine to the vehicle body in a longitudinal or transverse direction of the vehicle body. The vibration isolator 10 is mounted, for instance, so that the one direction B is consistent with the longitudinal or transverse direction. Therefore, the primary vibration is input in the other direction C, and the secondary vibration is input in the one direction B.

Next, an operation of the vibration isolator 10 constituted in this way will be described.

First, when the primary vibration is input from the vibration generating part, the inner tube 11 and the outer tube 12 are relatively displaced in the other direction C while elastically deforming the elastic body 13.

In this case, for example, due to the relative displacement between the inner tube 11 and the outer tube 12 and the elastic deformation of the auxiliary wall parts 32, the second pressure-absorbing fluid chamber 36 is expanded or contracted. Between the second pressure-absorbing fluid chamber 36 and the auxiliary fluid chamber 28 as shown in FIG. 4, a fluid flows through an interior of the second restricting passage 38, and fluid column resonance is generated in the second restricting passage 38. Thereby, vibration having the same frequency as a resonant frequency of the second restricting passage 38 is absorbed and attenuated. Since the inner tube 11 extends over the overall length of the second pressure-absorbing fluid chamber 36 in the axial direction A, the second pressure-absorbing fluid chamber 36 is greatly deformed over its overall length in the axial direction A, and is expanded or contracted.

In this case, for example, due to the elastic deformation of the main wall part 31 and the auxiliary wall parts 32, each of the first pressure-absorbing fluid chambers 35 is expanded or contracted. Between the first pressure-absorbing fluid chambers 35 and the auxiliary fluid chamber 28 as shown in FIG. 3, a fluid flows through interiors of the first restricting passages 37, and fluid column resonance is generated in the first restricting passages 37. Thereby, vibration having the same frequency as a resonant frequency of the first restricting passage 37 is absorbed and attenuated. The inner tube 11 extends over the overall length of the first pressure-absorbing fluid chambers 35 in the axial direction A. For this reason, the first pressure-absorbing fluid chambers 35 are greatly deformed over their overall length in the axial direction A, and are expanded or contracted.

When the inner tube 11 and the outer tube 12 are relatively displaced in the other direction C, the upper gap G1 is narrowed, and then the stopper part 33 is engaged with the inner circumferential surface of the outer tube 12, and additional relative displacement between the inner tube 11 and the outer tube 12 is restricted.

Further, when the secondary vibration is input from the vibration generating part, the inner tube 11 and the outer tube 12 are relatively displaced in the one direction B while elastically deforming the elastic body 13. Thereby, the pair of first pressure-absorbing fluid chambers 35 are individually expanded or contracted. A fluid flows through the interiors of the first restricting passage 37 between the first pressure-absorbing fluid chambers 35 and the auxiliary fluid chamber 28, and fluid column vibration is generated in the first restricting passages 37. Further, vibration having the same frequency as a resonant frequency of the first restricting passage 37 is absorbed and attenuated. The inner tube 11 extends over the overall length of the first pressure-absorbing fluid chambers 35 in the axial direction A. For this reason, the first pressure-absorbing fluid chambers 35 are greatly deformed over their overall length in the axial direction A, and are expanded or contracted.

In this way, when the inner tube 11 and the outer tube 12 are relatively displaced in the one direction B, the lateral gaps G2 are narrowed, and then the stopper part 33 is engaged with the inner circumferential surface of the outer tube 12, and additional relative displacement between the inner tube 11 and the outer tube 12 is restricted.

As described above, in the vibration isolator 10 according to the present embodiment, the inner tube 11 extends over the overall length of the pair of first pressure-absorbing fluid chambers 35 and the second pressure-absorbing fluid chamber 36 in the axial direction A. For this reason, when the vibrations of the one direction B and the other direction C are input to the vibration isolator 10, the inner tube 11 and the outer tube 12 are relatively displaced in the one direction B and the other direction C. Thereby, the pressure-absorbing fluid chambers 35 and 36 can be greatly deformed and expanded or contracted over their overall lengths in the axial direction A. Thereby, it is possible to easily greatly expand or contract the pressure-absorbing fluid chambers 35 and 36 while suppressing an amount of elastic deformation of the elastic body 13, and it is possible to suppress a load applied to the elastic body 13 to easily maintain the performance of the elastic body 13 for a long period of time.

Further, when viewed from the front, the outer tube 12 is formed in the rectangular shape having the first side parts 12a and the second side parts 12b. Thereby, it is possible to easily discriminate the one direction B from the other direction C, and to improve handleability of the vibration isolator 10.

Further, when the vibration isolator is installed in a space with predetermined restricted dimensions in a vehicle, it is possible to secure a great inner space of the outer tube, compared to when a vibration isolator having a circular outer tube is installed in such a space. For this reason, it is possible to equip the elastic body having a great volume. Thereby, it is possible to improve a spring characteristic. Further, it is possible to provide the fluid chamber having a high capacity. Thereby, it is possible to improve attenuation performance of the vibration isolator. In other words, in comparison with the circular outer tube, the rectangular outer tube secures a great inner space, and has a space that can be used for various applications. As a result, it is possible to improve a degree of freedom in designing the vibration isolator, and to cope with the predetermined dimensions required by a type of vehicle.

Further, when viewed from the front, the auxiliary wall parts 32 extend from the corners of the outer tube 12 in the inclined direction, and are coupled to the inner tube 11. For this reason, in comparison with a case in which the auxiliary wall parts 32 extend in the one direction B and the other direction C, the auxiliary wall parts 32 can be formed long. Thereby, when the auxiliary wall parts 32 are elastically deformed, it is possible to distribute the load applied to the auxiliary wall parts 32 to the entirety of the auxiliary wall parts 32, and to inhibit the load from being locally concentrated on the auxiliary wall parts 32. As a result, it is possible to easily maintain the performance of the auxiliary wall parts 32 for a long period of time.

Further, when the inner tube 11 and the outer tube 12 are relatively displaced in the one direction B, and when the inner tube 11 and the outer tube 12 are relatively displaced in the other direction C, the stopper part 33 is engaged with the inner circumferential surface of the outer tube 12, and restricts additional displacement. Thereby, it is possible to inhibit the elastic body 13 from being excessively deformed, and to reliably maintain the performance of the elastic body 13 for a long period of time with ease.

Further, since the stopper part 33 is disposed inside the outer tube 12, it is possible to inhibit the vibration isolator 10 from being made large by providing the stopper part 33.

The technical scope of the present invention is not limited to the aforementioned embodiment, but the present invention may be modified in various ways without departing from the gist of the present invention.

For example, the annular flange parts 17, the membrane member 20, the holding recess 21, the pressing plate 22, the communicating holes 23, the coating film 30, the stopper part 33, and the connecting membrane 34 may be omitted.

Further, in the embodiment, the outer tube 12 is constituted so that the inner tube part 16 is fitted into the outer tube part 15. Without being limited thereto, for example, the outer tube 12 may be constituted of one tubular member.

Further, in the embodiment, the stopper part 33 is constituted to be coupled to the outer circumferential surface of the inner tube 11 via the elastic body 13. However, without being limited thereto, the stopper part 33 may be directly coupled to the outer circumferential surface of the inner tube 11 without the elastic body 13.

Furthermore, in the embodiment, the stopper part 33 is coupled to the outer circumferential surface of the inner tube 11. Without being limited thereto, the stopper part 33 may be coupled to the inner circumferential surface of the outer tube 12, and be engaged with the outer circumferential surface of the inner tube 11 so as to restrict additional displacement when the inner tube 11 and the outer tube 12 are relatively displaced in the one direction B and when the inner tube 11 and the outer tube 12 are relatively displaced in the other direction C.

Further, in the embodiment, when viewed from the front, the auxiliary wall parts 32 extend from the corners of the outer tube 12 in the direction inclined to the one direction B and the other direction C, and are coupled to the inner tube 11. Without being limited thereto, for example, the auxiliary wall parts 32 may extend in the one direction B and the other direction C.

Further, in the embodiment, when viewed from the front, the outer tube 12 is formed in the rectangular shape. Without being limited thereto, the outer tube 12 may be formed, for instance, in an oval shape or in a circular shape.

Furthermore, in the embodiment, when viewed from the front, the inner tube 11 is formed in the trapezoidal shape. Without being limited thereto, the inner tube 11 may be formed, for instance, in an oval shape or in a circular shape.

In addition, in the embodiment, the outer tube 12 and the inner tube 11 are arranged coaxially. Without being limited thereto, for example, the axis of the outer tube 12 and the axis of the inner tube 11 may be mutually shifted.

Further, in the embodiment, the pair of first pressure-absorbing fluid chambers 35 communicates with each other through the first restricting passages 37 and the auxiliary fluid chamber 28. Without being limited thereto, the pair of first pressure-absorbing fluid chambers 35 may be interconnected, for instance, only through the first restricting passages 37 without the auxiliary fluid chamber 28.

Further, in the embodiment, the compression type vibration isolator is given as the vibration isolator 10. The vibration isolator may be a suspended vibration isolator mounted so that the second pressure-absorbing fluid chamber 36 is located at a vertical lower side, and the auxiliary fluid chamber 28 is located at a vertical upper side.

Further, the vibration isolator 10 according to the present invention is not limited to an engine mount of the vehicle. The vibration isolator 10 may also be applied to a component other than the engine mount. For example, the vibration isolator may also be applied to a mount of a power generator mounted on a construction machine, or a mount of a machine installed in a factory.

In addition, within the range that does not depart from the gist of the present invention, the components in the embodiment mentioned above may be appropriately substituted with well-known components, and furthermore, they may be appropriately combined with the modifications mentioned above.

INDUSTRIAL APPLICABILITY

According to the present invention, it is possible to obtain the vibration isolator capable of easily maintaining the performance of the elastic body for a long period of time.

REFERENCE SIGNS LIST

10: vibration isolator
11: inner tube
12: outer tube
13: elastic body
15: outer tube part
16: inner tube part
28: auxiliary fluid chamber
32: auxiliary wall part (partition part)
35: first pressure-absorbing fluid chamber
36: second pressure-absorbing fluid chamber
37: first restricting passage
38: second restricting passage
A: axial direction
B: one direction (sandwiching direction)
C: other direction (orthogonal direction)

The invention claimed is:

1. A vibration isolator comprising:
an inner tube that is coupled to one of a vibration generating part and a vibration absorbing part;
an outer tube that surrounds the inner tube from a radial outer side of the inner tube and is coupled to the other of the vibration generating part and the vibration absorbing part; and
an elastic body that couples the inner tube and the outer tube,
wherein a plurality of pressure-absorbing fluid chambers, which are filled with a fluid and whose walls are partly formed by the elastic body, are disposed inside the outer tube,
the pressure-absorbing fluid chambers include a pair of first pressure-absorbing fluid chambers that communicate with each other through first restricting passages, and a second pressure-absorbing fluid chamber that communicates with an auxiliary fluid chamber, in which the fluid is filled, through a second restricting passage,
the pair of first pressure-absorbing fluid chambers are disposed to sandwich the inner tube therebetween,
the second pressure-absorbing fluid chamber is arranged in parallel to the inner tube in an orthogonal direction perpendicular to both an axial direction of the inner tube and a sandwiching direction in which the inner tube is sandwiched between the pair of first pressure-absorbing fluid chambers, and
the inner tube runs along overall lengths of the pair of first pressure-absorbing fluid chambers and the second pressure-absorbing fluid chamber in the axial direction.

2. The vibration isolator according to claim 1, wherein the outer tube is formed in a rectangular shape having a pair of first side parts extending in the sandwiching direction and a pair of second side parts extending in the orthogonal direction when the vibration isolator is viewed from the front in the axial direction.

3. The vibration isolator according to claim 2, wherein:
the elastic body includes partition parts that separate the first pressure-absorbing fluid chamber and the second pressure-absorbing fluid chamber in a circumferential direction of the inner tube; and
the partition parts extend from corners of the outer tube in a direction inclined to both directions of the sandwiching direction and the orthogonal direction so as to be coupled to the inner tube when viewed from the front.

* * * * *